US008288479B2

(12) United States Patent
Akai et al.

(10) Patent No.: US 8,288,479 B2
(45) Date of Patent: Oct. 16, 2012

(54) PROPYLENE-BASED POLYMER, PROPYLENE-BASED POLYMER COMPOSITION, PELLET AND PRESSURE-SENSITIVE ADHESIVE

(75) Inventors: Ikuo Akai, Ichihara (JP); Hiroshi Hoya, Chiba (JP); Yoji Hayakawa, Chiba (JP); Koji Matsunaga, Yokohama (JP)

(73) Assignee: Mitsui Chemicals, Inc., Tokyo (JP)

( * ) Notice: Subject to any disclaimer, the term of this patent is extended or adjusted under 35 U.S.C. 154(b) by 97 days.

(21) Appl. No.: 12/449,475

(22) PCT Filed: Feb. 14, 2008

(86) PCT No.: PCT/JP2008/052398
§ 371 (c)(1),
(2), (4) Date: Aug. 10, 2009

(87) PCT Pub. No.: WO2008/099865
PCT Pub. Date: Aug. 21, 2008

(65) Prior Publication Data
US 2010/0093941 A1      Apr. 15, 2010

(30) Foreign Application Priority Data
Feb. 15, 2007    (JP) .................................. 2007-035562

(51) Int. Cl.
*C08F 8/00*    (2006.01)
*C08L 23/04*    (2006.01)
*C08L 23/10*    (2006.01)

(52) U.S. Cl. ....................................... 525/191; 525/240
(58) Field of Classification Search .................. 525/191, 525/240
See application file for complete search history.

(56) References Cited

U.S. PATENT DOCUMENTS
5,468,807 A    11/1995    Tsurutani et al.
7,122,584 B2    10/2006    Moriya et al.
7,919,561 B2 *    4/2011    Burkhardt et al. ............ 525/240
2006/0276607 A1    12/2006    Ikenaga et al.
2007/0251572 A1    11/2007    Hoya et al.

FOREIGN PATENT DOCUMENTS
| EP | 1 630 197 A1 | 3/2006 |
| EP | 2 042 553 A1 | 4/2009 |
| JP | 5-194802 | 8/1993 |
| JP | 2000-191861 | 7/2000 |
| JP | 2000-198893 | 7/2000 |
| JP | 2003-147135 | 5/2003 |
| JP | 2003-213485 | 7/2003 |
| WO | WO 02/085979 A1 | 10/2002 |
| WO | WO 2004/087775 A1 | 10/2004 |
| WO | WO-2006/057361 A1 | 6/2006 |

OTHER PUBLICATIONS

International Search Report received in corresponding International Application No. PCT/JP2008/052398 (2 pgs.).
First Office Action in CN Appln No. 200880001641.1 dated Nov. 1, 2010.
Communication (Supplementary EP Search Report) in EP Appln No. 08 71 1240 dated May 13, 2011.

* cited by examiner

*Primary Examiner* — Nathan M Nutter
(74) *Attorney, Agent, or Firm* — Foley and Lardner LLP

(57) ABSTRACT

Propylene-based polymers (A) are provided which, when used as pressure-sensitive adhesives to various adherends, show a desired initial adhesion and will not contaminate the adherends and which have excellent pellet handling properties. Pellets of the invention contain the propylene-based polymers (A). Pressure-sensitive adhesives of the invention contain the propylene-based polymers (A). The propylene-based polymer (A) includes 65 to 80 mol % of a structural unit derived from propylene, 5 to 10 mol % of a structural unit derived from ethylene and 15 to 25 mol % of a structural unit derived from a C4-20 α-olefin (wherein these percentages are calculated based on 100 mol % of the total of the structural unit derived from propylene, the structural unit derived from ethylene and the structural unit derived from a C4-20 α-olefin) and has a heat of crystal fusion of 5 to 45 (J/g) as measured by DSC. Compositions of the invention contain the propylene-based polymers (A).

4 Claims, No Drawings

PROPYLENE-BASED POLYMER, PROPYLENE-BASED POLYMER COMPOSITION, PELLET AND PRESSURE-SENSITIVE ADHESIVE

FIELD OF THE INVENTION

The present invention relates to propylene-based polymers and propylene-based polymer compositions that are suitably used as pressure-sensitive adhesives. In detail, the invention relates to propylene-based polymers which, when used as pressure-sensitive adhesives or pressure-sensitive adhesive sheets to various adherends, show a desired initial adhesion and will not contaminate the adherends over a long term and which have excellent pellet handling properties. The invention also relates to propylene-based polymer compositions containing the propylene-based polymers, pellets of the propylene-based polymers, and pellets of the propylene-based polymer compositions. The invention further relates to pressure-sensitive adhesives containing the propylene-based polymers.

BACKGROUND OF THE INVENTION

Plates of metal, glass or synthetic resin, and products or parts having such members are protected with a surface protection film that is a laminate of a pressure-sensitive adhesive layer and a substrate layer. For example, Patent Document 1 discloses masking tapes for metal plating that have a pressure-sensitive adhesive which contains a propylene-based polymer comprising propylene, a C4-12 α-olefin and ethylene as copolymer components and showing no endothermic peaks of 1 J/g or more in measurement with a differential scanning calorimeter (DSC) at 0 to 200° C. The films show no contaminating or discoloring tendency over periods as short as 3 days after application. However, the films contaminate adherends (leave marks when removed therefrom) after long periods such as one month or more. Further, the patent document does not give full consideration on pellet handling.
Patent Document 1: JP-A-2003-213485

SUMMARY OF THE INVENTION

It is an object of the present invention to provide propylene-based polymers and propylene-based polymer compositions which possess excellent handling properties such that pellets thereof do not have blocking and which, when used as pressure-sensitive adhesives to various adherends, show a desired initial adhesion and will not contaminate the adherends over a long term after application, thus being suitable for use as, for example, surface protection films.

It is another object of the invention to provide pellets which are resistant to blocking and are easily handled and which, when used as pressure-sensitive adhesives to various adherends, show a desired initial adhesion and will not contaminate the adherends over a long term after application and further which have good workability when blended with other thermoplastic resins or thermoplastic elastomers and can improve pressure-sensitive adhesion of other thermoplastic resins or thermoplastic elastomers.

It is a further object of the invention to provide pressure-sensitive adhesives which show a desired initial adhesion to various adherends and will not contaminate the adherends over a long term after application, thus being suitable for use as, for example, surface protection films.

A propylene-based polymer (A) according to the present invention comprises 65 to 80 mol % of a structural unit derived from propylene, 5 to 10 mol % of a structural unit derived from ethylene and 15 to 25 mol % of a structural unit derived from a C4-20 α-olefin and has a heat of crystal fusion of 5 to 45 J/g as measured by DSC.

In a preferred embodiment, the propylene-based polymer (A) has a degree of crystallinity of 5 to 30% as measured by wide-angle X-ray diffractometry. In a more preferred embodiment, the propylene-based polymer (A) also has a triad tacticity [mm fraction (%)] of not less than 85% as determined by $^{13}$C-NMR.

A propylene-based polymer composition (C) according to the present invention comprises 50 to less than 100 parts by weight of a propylene-based polymer (A) and from more than 0 to not more than 50 parts by weight of a polypropylene (B) (wherein the total of (A) and (B) is 100 parts by weight) wherein the propylene-based polymer (A) comprises 65 to 80 mol % of a structural unit derived from propylene, 5 to 10 mol % of a structural unit derived from ethylene and 15 to 25 mol % of a structural unit derived from a C4-20 α-olefin.

In a preferred embodiment of the propylene-based polymer composition (C), the propylene-based polymer (A) has a degree of crystallinity of 5 to 30% as measured by wide-angle X-ray diffractometry. In a more preferred embodiment, the propylene-based polymer (A) also has a triad tacticity [mm fraction (%)] of not less than 85% as determined by $^{13}$C-NMR.

A pellet (X1) according to the present invention comprises the propylene-based polymer (A).

A pellet (X2) according to the present invention comprises the propylene-based polymer composition (C).

A pressure-sensitive adhesive according to the present invention comprises the propylene-based polymer (A). In a preferred embodiment, the pressure-sensitive adhesive substantially comprises the propylene-based polymer (A) or the propylene-based polymer composition (C). In regard to the pressure-sensitive adhesives of the invention, the term "substantially" means that the weight of the polymer (A) or the composition (C) accounts for 95 wt % or more of the pressure-sensitive adhesive.

Another aspect of the present invention is directed to a pressure-sensitive adhesive sheet or film having at least one or more layers wherein the pressure-sensitive adhesive sheet or film has a pressure-sensitive adhesive layer comprising the pressure-sensitive adhesive.

ADVANTAGES OF THE INVENTION

The propylene-based polymers (A) and the propylene-based polymer compositions (C) of the invention possess excellent handling properties such that pellets thereof do not have blocking. The propylene-based polymers (A) and the propylene-based polymer compositions (C) when used as pressure-sensitive adhesives to various adherends show a desired initial adhesion and will not contaminate the adherends over a long term after application, thus being suitable for use as, for example, surface protection films.

The pellets (X1) of the propylene-based polymer (A) or the pellets (X2) of the propylene-based polymer composition (C) are resistant to blocking and are easily handled. Therefore, they have good workability when blended with other thermoplastic resins or thermoplastic elastomers and also can improve pressure-sensitive adhesion of other thermoplastic resins or thermoplastic elastomers.

The pressure-sensitive adhesives of the invention show a desired initial adhesion to various adherends and will not contaminate the adherends over a long term after application, thus being suitable for use as, for example, surface protection films.

PREFERRED EMBODIMENTS OF THE INVENTION

The present invention will be described in detail below.

Propylene-Based Polymers (A)

The propylene-based polymers (A) are copolymers that contain a structural unit derived from propylene at 65 to 80 mol %, preferably 65.6 to 80.0 mol %, a structural unit derived from ethylene at 5 to 10 mol %, preferably 5.0 to 9.4 mol %, and a structural unit derived from a C4-20 α-olefin at 15 to 25 mol %, preferably 15.0 to 25.0 mol % (wherein these percentages are calculated based on 100 mol % of the total of the structural unit derived from propylene, the structural unit derived from ethylene and the structural unit derived from a C4-20 α-olefin). The propylene-based polymers have a heat of crystal fusion of 5 to 45 J/g as measured by DSC.

Examples of the C4-20 α-olefins include 1-butene, 1-pentene, 1-hexene, 4-methyl-1-pentene, 1-octene, 1-decene, 1-dodecene, 1-tetradecene, 1-hexadecene, 1-octadecene and 1-eicosene. α-Olefins having 4 to 10 carbon atoms are preferable, and 1-butene is particularly preferable. Two or more kinds of the C4-20 α-olefins may be used in combination.

The propylene-based polymers (A) have a heat of crystal fusion of 5 to 45 J/g, and preferably 10 to 40 J/g as measured by DSC (differential scanning calorimetry). This heat of fusion ensures that pellets of the polymer have excellent blocking resistance and do not contaminate adherends.

In regard to the propylene-based polymers (A), the degree of crystallinity measured by X-ray diffractometry is not particularly limited but is generally in the range of 5 to 30%, preferably 5 to 25%, and more preferably 5 to 20%.

The propylene-based polymers (A) have a melt flow rate (MFR) of 1 to 10 g/10 min, and preferably 4 to 6 g/10 min as measured at 230° C. under 2.16 kg load in accordance with ASTM D 1238.

The propylene-based polymers (A) are preferably random copolymers. In detail, the B value of the propylene-based polymers (A) that is defined by G. R. Ray, et al. in Macromolecules, 10, 773 (1997) is usually from 0.9 to 1.5, and preferably from 0.9 to 1.3.

The propylene-based polymers (A) may be produced by any methods without limitation. For example, they may be prepared by copolymerizing propylene, ethylene and butene-1 or the like in the presence of a known catalyst capable of catalyzing stereoregular polymerization to afford isotactic or syndiotactic olefin polymers. Such catalysts include catalysts based on a solid titanium component and an organometallic compound and metallocene catalysts containing a metallocene compound as a component. To ensure that the pressure-sensitive adhesives of the invention will fully achieve the foregoing advantages, it is preferable to use metallocene catalysts capable of catalyzing stereoregular polymerization to afford an isotactic structure. Non-limiting examples of such metallocene catalysts include metallocene catalysts described in claims 6 to 8 in WO 2004/087775 filed by the present applicant. In the working examples of the present invention as will be described later, the synthesis of propylene-based polymers (A) involved a catalyst that contained a metallocene compound disclosed in Example 3c of the above international publication. However, the polymerization catalysts for use in the present invention are not limited thereto as long as the propylene-based polymers (A) meet the requirements in claim 1 of the present invention.

The propylene-based polymers (A) preferably have a molecular weight distribution (Mw/Mn relative to polystyrene standards, Mw: weight average molecular weight, Mn: number average molecular weight) by GPC of not more than 4.0, more preferably not more than 3.0, and particularly preferably not more than 2.5.

The propylene-based polymers (A) preferably have a triad tacticity [mm fraction (%)] by $^{13}$C-NMR of not less than 85%, more preferably in the range of 85 to 97.5%, still more preferably 87 to 97%, and particularly preferably 90 to 97%.

The Shore A hardness of the propylene-based polymers (A) is not particularly limited but is usually not less than 75, and preferably not less than 78. The Shore A hardness in this range ensures that the propylene-based polymer (A) used as a pressure-sensitive adhesive will show a desired initial adhesion and will be less likely to contaminate adherends over a long term after application.

The triad tacticity (mm fraction) may be determined by a method described in WO 2004/087775, from page 21, line 7 to page 26, line 6.

The propylene-based polymers (A) may contain known additives as required while still achieving the objects of the invention. Exemplary additives are weathering stabilizers, heat stabilizers, antistatic agents, anti-slip agents, anti-blocking agents, anti-fogging agents, lubricants, pigments, dyes, plasticizers, anti-aging agents, hydrochloric acid absorbents, antioxidants, nucleating agents, mildew-proofing agents, antibacterial agents and flame retardants.

The propylene-based polymers (A) having the above characteristics can satisfactorily achieve the objects of the present invention. In detail, pellets of the polymers are resistant to blocking and are easily handled; the propylene-based polymers (A) when used as pressure-sensitive adhesives to various adherends show a desired initial adhesion and will not contaminate the adherends over a long term after application, thus being suitably used as surface protection films.

The propylene-based polymer compositions (C) according to the invention contain the propylene-based polymer (A) and a polypropylene (B). Hereinbelow, the polypropylenes (B) and the propylene-based polymer compositions (C) will be described.

Polypropylenes (B)

The polypropylenes (B) for use in the invention include propylene homopolymers and copolymers of propylene and at least one selected from ethylene and C4-20 α-olefins. Examples of the C4-20 α-olefins include 1-butene, 1-pentene, 1-hexene, 4-methyl-1-pentene, 1-octene, 1-decene, 1-dodecene, 1-tetradecene, 1-hexadecene, 1-octadecene and 1-eicosene. Preferred polypropylenes (B) include homopolypropylenes and copolymers of propylene with ethylene or a C4-10 α-olefin. The copolymers of propylene with ethylene or α-olefins may be random copolymers or block copolymers.

It is preferable that the polypropylenes (B) have an isotactic pentad fraction (mmmm) by NMR of not less than 0.9, and more preferably not less than 0.95. The isotactic pentad fraction (mmmm) may be measured and calculated by methods described in JP-A-2003-147135.

The polypropylenes (B) generally have a melt flow rate (MFR) of 0.01 to 100 g/10 min, preferably 0.05 to 20 g/10 min, and more preferably 0.5 to 15 g/min as measured at 230° C. under a load of 2.16 kg in accordance with ASTM D 1238.

Non-limiting examples of the polypropylenes (B) include homopolypropylenes, block polypropylenes (known block polypropylenes that generally contain 3 to 30 wt % of rubber components soluble in n-decane at 23° C.) and random polypropylenes (generally having a melting point of 110 to 150° C. measured by DSC, such as random polypropylenes containing a C2-20 α-olefin other than propylene at from more than 0 to 9 mol %, and preferably from 1 to 7 mol % based on 100 mol % of the total of propylene and the C2-20 α-olefin).

In a particularly preferred embodiment for fully achieving the objects of the invention, the polypropylenes (B) are propylene homopolymers or propylene copolymers containing more than 0 and not more than 3 mol % of a structural unit derived from ethylene and/or a structural unit derived from the C4-20 α-olefin relative to the total of a structural unit derived from propylene, and the structural unit derived from ethylene and/or the structural unit derived from the C4-20 α-olefin. Such polypropylenes show high heat resistance and good compatibility with the propylene-based polymers (A).

In the invention, a plurality of the polypropylenes (B) may be used in combination as required. For example, two or more kinds of polypropylenes differing in melting point or rigidity may be used together.

The polypropylenes (B) may be produced by polymerizing propylene or copolymerizing propylene with ethylene or the α-olefin of 4 or more carbon atoms in the presence of a Ziegler catalyst system containing a solid catalyst component, an organoaluminum compound and an electron donor wherein the solid catalyst component essentially contains magnesium, titanium, halogen and an electron donor, or in the presence of a metallocene catalyst system containing a metallocene compound.

Propylene-Based Polymer Compositions (C)

The propylene-based polymer compositions (C) according to the present invention contain 50 to less than 100 parts by weight of the propylene-based polymer (A) and from more than 0 to 50 parts by weight of the polypropylene (B) (wherein the total of the propylene-based polymer (A) and the polypropylene (B) is 100 parts by weight).

The propylene-based polymer compositions (C) may be prepared by producing the propylene-based polymer component (A) and the polypropylene component (B) in the foregoing amounts by multistage polymerization, or by mixing the propylene-based polymer component (A), the polypropylene component (B) in the foregoing amounts and optionally known additives as described below by various known methods using Henschel mixers, twin-cylinder mixers, ribbon blenders or tumbler mixers. After the mixing, the composition may be melt kneaded using a single-screw extruder, a twin-screw extruder, a kneader or a Banbury mixer and may be pelletized or crushed.

The propylene-based polymer compositions (C) may contain known additives as required while still achieving the objects of the invention. Exemplary additives in accordance with the intended use are weathering stabilizers, heat stabilizers, antistatic agents, anti-slip agents, anti-blocking agents, anti-fogging agents, lubricants, pigments, dyes, plasticizers, anti-aging agents, hydrochloric acid absorbents, antioxidants, nucleating agents, mildew-proofing agents, antibacterial agents and flame retardants.

The propylene-based polymer compositions (C) having the above amounts of the polypropylene (B) and the propylene-based polymer (A) with the foregoing characteristics can satisfactorily achieve the objects of the invention. In detail, pellets of the compositions are easily handled; the propylene-based polymer compositions (C) when used as pressure-sensitive adhesives to various adherends show a desired initial adhesion and will not contaminate the adherends over a long term after application, thus being suitably used as surface protection films.

The pellets (X1) of the invention are obtained by pelletizing the propylene-based polymer (A). The pellets (X2) are obtained by pelletizing the propylene-based polymer composition (C).

The degree of crystallinity of the pellets (X2) is not particularly limited and may be 5% or more as measured by X-ray diffractometry.

The melt flow rate (MFR) of the pellets (X2) is not particularly limited and may be in the range of 1 to 20 g/10 min. as measured at 230° C. under a load of 2.16 kg in accordance with ASTM D 1238.

The pellets (X1) and (X2) can satisfactorily achieve the objects of the invention. In detail, they are resistant to blocking and are easily handled; the pellets when used as pressure-sensitive adhesives to various adherends show a desired initial adhesion and will not contaminate the adherends over a long term after application, thus being suitably used as surface protection films.

The pellets (X1) of the propylene-based polymer (A) or the pellets (X2) of the propylene-based polymer composition (C) are unlikely to cause blocking and are easily handled, permitting good workability when blended with other thermoplastic resins or thermoplastic elastomers. Furthermore, the pellets can improve pressure-sensitive adhesion of other thermoplastic resins or thermoplastic elastomers.

For example, the propylene-based polymers (A) or the propylene-based polymer compositions (C) may be formed into the pellets (X1) or the pellets (X2), respectively, by the following methods.

(1) The resin is molten by heating in a single-screw extruder, a twin-screw extruder or a feeder ruder, then shaped into a strand, cooled in a water bath or the like and cut with a pelletizer.

(2) The resin is molten by heating in a single-screw extruder, a twin-screw extruder or a feeder ruder equipped with an underwater pelletizer, is extruded and is cut in water, and the wet pellets is dried by dehydration.

(3) The resin in a heated and molten state is cooled and crushed.

To prevent reaggregation or blocking of the pellets, a liquid or powder may be attached on the surface of the pellets as required while still achieving the objects of the invention. For example, methods as described in WO 2002/085979 may be adopted.

The pressure-sensitive adhesives according to the present invention contain the propylene-based polymer (A). In a preferred embodiment of the pressure-sensitive adhesives containing the propylene-based polymer (A), the adhesives are the propylene-based polymer compositions (C) that contain the propylene-based polymer (A) and the polypropylene (B).

In an embodiment, the pressure-sensitive adhesives may contain the propylene-based polymer (A) and a thermoplastic resin other than the propylene-based polymers (A) and the polypropylenes (B) and/or a thermoplastic elastomer other than the propylene-based polymers (A) and the polypropylenes (B) (the resin and the elastomer will be collectively referred to as the components (D)).

In other words, the pressure-sensitive adhesives of the invention described hereinabove are classified into the following three kinds [N-1], [N-2] and [N-3].

[N-1] Pressure-sensitive adhesives substantially composed of the propylene-based polymer (A).

[N-2] Pressure-sensitive adhesives substantially composed of the propylene-based polymer composition (C).

[N-3] Pressure-sensitive adhesives substantially composed of the propylene-based polymer (A) and the component (D).

In regard to the pressure-sensitive adhesives of the present invention, the term "substantially" means that the pressure-sensitive adhesive [N-1] or [N-2] contains the propylene-based polymer (A) or the polymer composition (C), respectively, at not less than 95 wt % and the remaining less than 5 wt % is accounted for by known additives and/or any of the components (D) as described later. In the case of the pressure-sensitive adhesives [N-3], the term is defined to indicate that the pressure-sensitive adhesive contains the propylene-based polymer (A) and the component (D) in a total amount of not less than 95 wt % and the remaining less than 5 wt % is represented by known additives and/or the component (B).

Hereinbelow, the pressure-sensitive adhesives [N-3] will be described.

The proportions of the propylene-based polymer component (A) and the component (D) in the pressure-sensitive adhesive [N-3] are 1 to 100 parts by weight for the propylene-based polymer (A) and 0 to 99 parts by weight for the component (D). When the component (D) is not zero, the proportions are preferably 1 to 99 parts by weight, more preferably 40 to 99 parts by weight, and still more preferably 70 to 95 parts by weight for the propylene-based polymer (A) and 99 to 1 parts by weight, more preferably 60 to 1 parts by weight, and still more preferably 5 to 30 parts by weight for the component (D) (wherein the total of the propylene-based polymer (A) and the component (D) is 100 parts by weight).

The components (D) are not particularly limited. For example, polyolefin thermoplastic resins and polyolefin thermoplastic elastomers are preferred. Examples of the polyolefin thermoplastic resins and the polyolefin thermoplastic elastomers include ethylene polymers. Specific examples are low-density polyethylenes, linear low-density polyethylenes, medium-density polyethylenes, copolymers of ethylene and C3-20 α-olefins, copolymers of ethylene, C3-20 α-olefins and cyclic olefins, and copolymers of ethylene and vinyl compound comonomers such as styrene, vinyl acetate, (meth)acrylic acid and (meth)acrylates.

Examples of the components (D) further include polystyrene elastomers. The polystyrene elastomers include block copolymers (SBS copolymers) of hard polystyrene blocks (crystalline part) and soft diene monomer blocks, hydrogenated styrene/butadiene/styrene block copolymers (HSBR) and styrene/ethylene/propylene/styrene block copolymers (SEBS). The polystyrene elastomers may be used singly, or two or more kinds may be used in combination.

The styrene/ethylene/propylene/styrene block copolymers are hydrogenated products of styrene/isobutylene/styrene block copolymers (SIS). Commercially available SIS copolymers include JSR SIS (registered trademark) from JSR Corporation and KRATON D (registered trademark) from SHELL CHEMICALS. Specific examples of the SEPS copolymers include SEPTON (registered trademark) manufactured by KURARAY CO., LTD.

Examples of the thermoplastic resins and the thermoplastic elastomers further include olefin block copolymer elastomers such as block copolymers consisting of hard portion, which is highly crystalline polyolefin blocks, such as polypropylene and soft portion, such as amorphous copolymers of monomers. Specific examples include olefin (crystalline)/ethylene/butylene/olefin block copolymers and polypropylene/polyolefin (amorphous)/polypropylene block copolymers. Commercially available resins or elastomers include DYNARON manufactured by JSR Corporation.

The components (D) include the following components (hereinafter, also referred to as the components (D1)). Such components are tackifier components of resinoid generally produced and sold as tackifier. Specific examples include coumarone resins such as coumarone-indene resin; phenolic resins such as phenol/formaldehyde resin and xylene/formaldehyde resin; terpene resins such as terpene/phenol resin, terpene resins (α- or β-pinene resin), aromatized terpene resins and hydrogenated terpene resins; petroleum hydrocarbon resins such as synthetic polyterpene resins, aromatic hydrocarbon resins, aliphatic hydrocarbon resins, alicyclic hydrocarbon resins, hydrogenated hydrocarbon resins and hydrocarbon tacky resins; and rosin derivatives such as rosin pentaerythritol ester, rosin glycerin ester, hydrogenated rosin, hydrogenated rosin ester, special rosin ester and rosin tackifiers.

Of the components (D1), those having a softening point of 70° C. or above, and preferably from 70 to 130° C. are mentioned, with examples including hydrogenated resins such as hydrogenated hydrocarbon resins, hydrogenated alicyclic hydrocarbon resins, hydrogenated aliphatic/alicyclic petroleum resins, hydrogenated terpene resins and hydrogenated synthetic polyterpene resins; and rosin derivatives such as rosin pentaerythritol ester, rosin glycerin ester, hydrogenated rosin, hydrogenated rosin ester, rosin glycerin ester, hydrogenated rosin, hydrogenated rosin ester, special rosin ester and rosin tackifiers. The components (D1) are generally called tackifiers.

The pressure-sensitive adhesives may contain known additives as required while still achieving the objects of the invention. Exemplary additives in accordance with the intended use are weathering stabilizers, heat stabilizers, antistatic agents, anti-slip agents, anti-blocking agents, anti-fogging agents, lubricants, pigments, dyes, plasticizers, anti-aging agents, hydrochloric acid absorbents, antioxidants, nucleating agents, mildew-proofing agents, antibacterial agents and flame retardants.

By adding the components (D) to the component (A), the pressure-sensitive adhesion with respect to adherends may be controlled as required.

Another aspect of the present invention is directed to pressure-sensitive adhesive sheets or films having at least one or more layers wherein the pressure-sensitive adhesive sheets or films have a pressure-sensitive adhesive layer comprising the foregoing pressure-sensitive adhesive. Such multilayer films having the pressure-sensitive adhesive of the invention may be obtained by laminating a surface layer (a pressure-sensitive adhesive layer) of the pressure-sensitive adhesive [N-1], [N-2] or [N-3] containing the propylene-based polymer (A), on one or both surfaces of a single-layer or multilayer base.

The base layers of the multilayer films are not particularly limited but are preferably thermoplastic resins such as polypropylene resins (propylene homopolymers and random or block copolymers of propylene and small amounts of α-olefins), polyethylene resins (low-density polyethylene, medium-density polyethylene, high-density polyethylene and linear low-density polyethylene), known ethylene polymers (ethylene/α-olefin copolymers, ethylene/ethyl acrylate copolymer, ethylene/vinyl acetate copolymer, ethylene/methyl methacrylate copolymer, ethylene/n-butyl acrylate copolymer), poly-4-methyl-pentene-1, and combinations of these polymers.

In order to obtain good adhesion between the surface layer (pressure-sensitive adhesive layer) and the base, it is preferable that the layer that will be in direct contact with the surface layer (pressure-sensitive adhesive layer) is formed of a polyolefin resin that has high compatibility with the pressure-sensitive adhesive [N-1], [N-2] or [N-3] containing the propylene-based polymer (A).

The surface of the base layer may be treated by surface treating methods such as corona discharge treatment, plasma treatment, flame treatment, electron beam irradiation and UV irradiation. The base layer may be a colorless transparent layer or may be a colored or printed layer.

Uniaxially or biaxially stretched bases may be used.

The multilayer films having the pressure-sensitive adhesive of the invention may be fabricated by known methods for producing multilayer films. A preferred method is a co-extrusion method wherein the pressure-sensitive adhesive [N-1], [N-2] or [N-3] containing the propylene-based polymer (A), and a material of the base layer are coextruded by a T-die extrusion method or a blown-film extrusion method to form the surface layer and the base layer, respectively. Also preferably, the pressure-sensitive adhesive [N-1], [N-2] or [N-3] containing the propylene-based polymer (A) may be extruded on a previously-formed base to form the surface layer coating the base.

The multilayer films of the invention may be uniaxially or biaxially stretched. A preferred example of uniaxial stretching method is conventional roll stretching. Exemplary biaxial stretching methods are successive stretching in which first stretching is followed by second stretching, and simultaneous biaxial stretching such as tubular stretching. In an embodiment, the pressure-sensitive adhesive may be dissolved in a solvent and be applied to the base.

The thickness of the surface protection film (multilayer film) having the pressure-sensitive adhesive of the invention is not particularly limited but is preferably about 5 to 5000 μm, and more preferably about 10 to 1000 μm. The thickness of the surface layer (pressure-sensitive adhesive layer) is not particularly limited and may be determined appropriately depending on the kind of the adherend or required properties (e.g., bond strength); generally, the thickness is 1 to 1000 μm, and preferably 3 to 500 μm.

When the multilayer films having the pressure-sensitive adhesive of the invention are used as surface protection films, a release paper or a release film may be interposed between the films or a release agent may be applied to the back surface of the base layer in order to prevent blocking (sticking together) of the multilayer films.

The thermoplastic resins for the base layers may be blended with additives such as release agents as required to provide functions such as slip properties on the surface of the base layers.

The multilayer films having the pressure-sensitive adhesive of the invention may be suitably used as surface protection films for metal plates such as aluminum plates, steel plates and stainless steel plates, painted plates of such metals, processing members such as glass plates and synthetic resin plates, and home electric appliances, automotive parts and electronic components using these members. Exemplary applications include protection films in the electronics industry such as lens-protection films, semiconductor wafer back grinding tapes, dicing tapes and printed board-protection tapes, and window glass-protection films and protection films for baking finishing.

EXAMPLES

The present invention will be described in detail hereinbelow based on examples.

Items to be evaluated and evaluation methods of the pressure-sensitive adhesives according to the present invention were described hereinbelow.

[E1] Non-Contaminating Properties with Adherends

A pressure-sensitive adhesive layer of a pressure-sensitive adhesive film sample was attached to a black tile (manufactured by INAX Corporation, product name: INTERIOR TILE INAX, model: SPKC-100, color: L06-J, shape: 100 flat square) at room temperature with a rubber roller, thereby preparing a test sample. The test samples were placed in a temperature-controlled room at of atmosphere of 40° C., and were aged therein for 2 weeks and 2 months. The pressure-sensitive adhesive film samples were removed from the respective test samples, and the surface of the tiles was visually observed for any transfer of the adhesive. The evaluation criteria were as follows.

AA: No contamination

CC: Contamination

[E2] Adhesion

The adhesion was measured in accordance with a testing method for pressure-sensitive adhesive films (JIS Z 0237-2000). The pressure-sensitive adhesive film sample was covered with a 25 μm thick polyethylene terephthalate sheet on the surface thereof that was not tested for adhesion. A 50 mm×150 mm×2 mm SUS-BA plate as a test plate and the pressure-sensitive adhesive film were allowed to stand in an environment at 23° C. and 50% RH for 1 hour. Thereafter, the pressure-sensitive adhesive film was attached to the test plate by moving an approximately 2 kg robber roll two times back and forth on the adhesive film. The unit was allowed to stand in an environment at 23° C. and 50% RH for 30 minutes. The adhesion as initial adhesion was measured by peeling the adhesive film from the SUS-BA plate at 180° angle and 300 mm/min in an environment at 23° C. and 50% RH.

[E3] Pellet Handling Properties

Sample pellets weighing 60 g (average weight per one pellet: about 40 mg) were placed in a 120 mm×210 mm polyethylene bag. The bag was folded in three and the mouth of the bag was closed with an adhesive tape. Two such bags folded in three as above were stacked together, and a 90 g/cm$^2$ load was applied thereon. The bags were kept pressed for 24 hours, and the pellets were taken out from the bags. Anti-blocking properties of the pellets were evaluated based on the following criteria.

AA: No blocking.

BB: The pellets adhered to one another but were separated by hand.

CC: The pellets adhered to one another and were hardly separated by hand.

Propylene-based polymers (A) and polypropylene (B) used in Examples and Comparative Examples were prepared and analyzed as follows and had the following properties.

[1] Propylene-Based Polymers (A)

(A-1) Propylene/butene/ethylene random copolymer (PBER)

Ethylene content: 9 mol %, 1-butene content: 20 mol %, MFR (230° C.): 4 g/10 min, crystallinity degree by X-ray diffractometry: 16%, molecular weight distribution (Mw/Mn): 2.0, Shore A hardness: 80, mm value: 94%, heat of crystal fusion: 17 J/g.

(A-2) Propylene/Butene/Ethylene Random Copolymer (PBER)

Ethylene content: 6 mol %, 1-butene content: 20 mol %, MFR (230° C.): 4 g/10 min, crystallinity degree by X-ray diffractometry: 29%, molecular weight distribution (Mw/Mn): 2.0, Shore A hardness: 96, mm value: 94%, heat of crystal fusion: 37 J/g.

(A-3) Propylene/Butene/Ethylene Random Copolymer (PBER)

Ethylene content: 6 mol %, 1-butene content: 24 mol %, MFR (230° C.): 5 g/10 min, crystallinity degree by X-ray diffractometry: 27%, molecular weight distribution (Mw/Mn): 2.0, Shore A hardness: 94, mm value: 94%, heat of crystal fusion: 36 J/g.

(A-4) Propylene/Butene/Ethylene Random Copolymer (PBER)

Ethylene content: 9 mol %, 1-butene content: 21 mol %, MFR (230° C.): 7 g/10 min, crystallinity degree by X-ray diffractometry: 15%, molecular weight distribution (Mw/Mn): 2.0, Shore A hardness: 82, mm value: 94%, heat of crystal fusion: 16 J/g.

(A-5) Propylene/Butene/Ethylene Random Copolymer (PBER)

Ethylene content: 11 mol %, 1-butene content: 20 mol %, MFR (230° C.): 6 g/10 min, crystallinity degree by X-ray diffractometry: 4%, molecular weight distribution (Mw/Mn): 2.0, Shore A hardness: 60, mm value: 93%, heat of crystal fusion: 0.5 J/g.

These propylene/ethylene/1-butene copolymers were produced in accordance with a method disclosed in WO 2004/087775 while controlling the composition and polymerization conditions. In detail, the propylene/ethylene/1-butene copolymers (A-1) to (A-5) were manufactured by the following procedures.

Synthetic Example 1

Synthesis of Metallocene Compound

Diphenylmethylene(3-tert-butyl-5-methyl-cyclopentadienyl)(2,7-di-tert-butyl-fluorenyl)zirconium dichloride was synthesized by procedures of Example 3c in WO 2004/087775.

Synthetic Example 2

Preparation of Propylene/Ethylene/Butene Copolymer (A-1)

A thoroughly nitrogen-purged 2000 ml polymerization reactor was charged with 780 ml of dry hexane, 70 g of 1-butene, and triisobutylaluminum (1.0 mol) at normal temperature. The internal temperature of the polymerization reactor was increased to 55° C., and the pressure in the system was increased to 0.7 MPaG with propylene and then controlled at 0.72 MPaG with ethylene. Subsequently, the polymerization reactor was charged with a toluene solution in which 0.001 mmol of diphenylmethylene(3-tert-butyl-5-methyl-cyclopentadienyl)(2,7-di-tert-butyl-fluorenyl)zirconium dichloride synthesized in Synthetic Example 1 was in contact with 0.3 mmol in terms of aluminum of methylaluminoxane (manufactured by Tosoh Finechem Corporation). Polymerization was then performed at an internal temperature of 55° C. for 30 minutes while keeping the internal pressure at 0.72 MPaG with ethylene. The polymerization was terminated by adding 20 ml of methanol, followed by degassing. The polymer was precipitated from the polymerization solution by pouring the solution to 2 L of methanol, and was vacuum dried at 130° C. for 10 hours. The polymer (A-1) obtained weighed 40.2 g. The ethylene content was 9 mol %, and the butene content was 20 mol %. The molecular weight distribution (Mw/Mn) measured by GPC was 2.0. MFR (230° C., 2.1 kg) was 4 g/10 min, and the crystallinity degree by X-ray diffractometry was 16%. The Shore A hardness was 80, and the mm value by NMR was 94%. Polymerization was repeated under the above conditions, and total 400 g of the polymer (A-1) was obtained.

Synthetic Example 3

Preparation of Propylene/Ethylene/Butene Copolymer (A-2)

Polymerization was carried out in the same manner as in Synthetic Example 2, except that the internal pressure was kept at 0.71 MPaG with ethylene. The polymer (A-2) obtained weighed 38.9 g. The ethylene content was 4 mol %, and the butene content was 29 mol %. The molecular weight distribution (Mw/Mn) measured by GPC was 2.0. MFR (230° C., 2.1 kg) was 4 g/10 min, and the crystallinity degree by X-ray diffractometry was 29%. The Shore A hardness was 96, and the mm value by NMR was 94%. Polymerization was repeated under the above conditions, and total 400 g of the polymer (A-2) was obtained.

Synthetic Example 4

Preparation of Propylene/Ethylene/Butene Copolymer (A-3)

Polymerization was carried out in the same manner as in Synthetic Example 2, except that the amount of 1-butene was changed to 85 g and the polymerization time was changed to 23 minutes. The polymer (A-3) obtained weighed 38.8 g. The ethylene content was 6 mol %, and the butene content was 24 mol %. The molecular weight distribution (Mw/Mn) measured by GPC was 2.0. MFR (230° C., 2.1 kg) was 5 g/10 min, and the crystallinity degree by X-ray diffractometry was 27%. The Shore A hardness was 94, and the mm value by NMR was 94%. Polymerization was repeated under the above conditions, and total 400 g of the polymer (A-3) was obtained.

Synthetic Example 5

Preparation of Propylene/Ethylene/Butene Copolymer (A-4)

Polymerization was carried out in the same manner as in Synthetic Example 2, except that the amount of 1-butene was changed to 75 g and the polymerization temperature and time were changed to 57° C. and 30 minutes, respectively. The polymer (A-4) obtained weighed 39.5 g. The ethylene content was 9 mol %, and the butene content was 21 mol %. The molecular weight distribution (Mw/Mn) measured by GPC was 2.0. MFR (230° C., 2.1 kg) was 5 g/10 min, and the crystallinity degree by X-ray diffractometry was 15%. The Shore A hardness was 82, and the mm value by NMR was 94%. Polymerization was repeated under the above conditions, and total 400 g of the polymer (A-4) was obtained.

Synthetic Example 6

Preparation of Propylene/Ethylene/Butene Copolymer (A-5)

Polymerization was carried out in the same manner as in Synthetic Example 5, except that the internal pressure was kept at 0.725 MPaG with ethylene. The polymer (A-5) obtained weighed 41.2 g. The ethylene content was 11 mol %, and the butene content was 20 mol %. The molecular weight distribution (Mw/Mn) measured by GPC was 2.0. MFR (230° C., 2.1 kg) was 6 g/10 min, and the crystallinity degree by X-ray diffractometry was 4%. The Shore A hardness was 60, and the mm value by NMR was 93%. Polymerization was repeated under the above conditions, and total 400 g of the polymer (A-5) was obtained.

[2] Polypropylene (B)

An isotactic homopolypropylene (hPP) having Tm=161° C., MFR (230° C.)=7.0 g/10 min, mmmm=97% and Mw/Mn=4.3 was used as polypropylene (B). The homopolypropylene was prepared with a known Ziegler-Natta catalyst.

The physical properties of the propylene-based polymers (A) and polypropylene (B) were measured by the following methods.

[R1] Comonomer (Ethylene, 1-Butene) Contents and Stereoregularity (mm and mmmm)

These properties were determined by analyzing a $^{13}$C-NMR spectrum.

[R2] Melt Flow Rate (MFR)

MFR was measured at 190° C. or 230° C. under a load of 2.16 kg in accordance with ASTM D 1238.

[R3] Heat of Crystal Fusion

Approximately 5 mg of a sample was placed in a DSC aluminum pan, and the aluminum pan was set in a DSC apparatus. In a nitrogen atmosphere, the sample was molten by heating at 220° C. for 10 minutes and was cooled to room temperature at a rate of 10° C./min. The sample was then taken out from the DSC apparatus and was allowed to stand at 23° C. for 10 days. The aluminum pan containing the sample was again set in the DSC apparatus. The temperature was lowered from room temperature to −20° C. at a rate of 20° C./min, kept at −20° C. for 5 minutes, and increased to 200° C. at a rate of 20° C./min. The heat of fusion was obtained from an endothermic curve recorded during the last heating process.

[R4] Degree of Crystallinity

The degree of crystallinity was calculated by wide-angle X-ray diffractometry as follows. X-ray used in the measurement was generated using X-ray diffractometer RINT 2500 manufactured by Rigaku Corporation. A copper anticathode was used as a target, and the X-ray point-focused at an output of 50 kV and 300 mA was applied to the sample. The intensity of diffracted X-ray was measured with a scintillation counter. The 2 θ scanning was performed in the range of 5 to 35°, and a wide-angle X-ray diffraction profile of the sample was obtained.

The sample tested herein was prepared as follows. In a nitrogen atmosphere, a sample resin was molten by heating at 220° C. for 10 minutes and was cooled to room temperature at a rate of 10° C./min. The sample resin was then allowed to stand at 23° C. for at least 10 days. Separately, an amorphous sample of the same resin was prepared as follows.

In a nitrogen atmosphere, a polymer of the same kind as the polymer to be tested was molten by heating at 220° C. for 10 minutes and was cooled to room temperature at a rate of 10° C./min The polymer was then allowed to stand at 23° C. for 8 hours to give an amorphous sample. This sample was confirmed to be amorphous by DSC showing no endothermic peaks.

Herein, DSC was performed by lowering the temperature from room temperature to −20° C. at a rate of 20° C./min, keeping it at −20° C. for 5 minutes, and increasing the temperature to 200° C. at a rate of 20° C./min. The heat of fusion was measured from an endothermic curve recorded during the last heating process.

The amorphous sample was analyzed in the same manner as described above, and an X-ray diffraction profile (amorphous halo) of the amorphous sample was obtained. Based on this diffraction profile of the amorphous sample, the X-ray diffraction profile of the test sample was separated into an amorphous halo and crystal peaks. The degree of crystallinity of the test sample was obtained by eliminating the baseline and calculating the percentage of the areas of the crystal peaks combined relative to the total area.

[R5] Molecular Weight Distribution (Mw/Mn)

Molecular weights (Mw: weight average molecular weight, Mn: number average molecular weight, relative to polystyrene standards) were determined by GPC (gel permeation chromatography) in orthodichlorobenzene (mobile phase) at a column temperature of 140° C. In detail, the molecular weight distribution (Mw/Mn) was measured by means of gel permeation chromatograph Alliance GPC-2000 manufactured by Waters Corporation in the following manner. The separation columns used were two columns of TSK gel GNH6-HT and two columns of TSK gel GNH6-HTL, each having a diameter of 7.5 mm and a length of 300 mm. The column temperature was 140° C. The mobile phase was o-dichlorobenzene (manufactured by Wako Pure Chemical Industries, Ltd.) that contained 0.025 wt % of BHT (manufactured by Takeda Pharmaceutical Company Limited) as an antioxidant. The mobile phase was flowed at a rate of 1.0 ml/min. The sample concentration was 15 mg/10 ml, and 500 μl of the sample was injected. A differential refractometer was used as a detector. Standards used for the measurement of Mw<1000 and Mw>4×10$^6$ were polystyrenes manufactured by Toso Corporation and those for the measurement of 1000≦Mw≦4×10$^6$ were polystyrenes manufactured by Pressure Chemical Co.

[R6] Shore A Hardness

The polymer was molded with a hot press at 190° C. and was cooled to room temperature and aged for 10 days to give a sheet sample of 2 mm in thickness. The sheet sample was tested using an A-type measuring device and the hardness was determined by reading the scale immediately after the indenter touched the sample (in accordance with ASTM D 2240).

[Examples 1-11] and [Comparative Examples 1-2]

The materials in amounts shown in Table 1, 2 or 3 were kneaded with Labo Plastomill (manufactured by Toyo Seiki Seisaku-Sho, Ltd.) at 40 rpm and 190° C. for 5 minutes and extruded into a strand through a feeder ruder. The strand was cooled and solidified in a water bath at 10° C. for 5 minutes and was cut into pellets with a pelletizer. The pellets were tested by the aforementioned methods to evaluate pellet handling properties and other physical properties.

Further, the pellets were heated at 190° C. under a load of 5 MPa for 5 minutes and cooled at 20° C. for 5 minutes to give a pressure-sensitive adhesive sheet having a thickness of 100 μm.

TABLE 1

|  |  | Example 1 | Example 2 | Example 3 | Example 4 | Comparative Example 1 |
|---|---|---|---|---|---|---|
| A-1 |  | 95 | 0 | 0 | 0 | 0 |
| A-2 |  | 0 | 95 | 0 | 0 | 0 |
| A-3 |  | 0 | 0 | 95 | 0 | 0 |
| A-4 |  | 0 | 0 | 0 | 95 | 0 |
| A-5 |  | 0 | 0 | 0 | 0 | 95 |
| B |  | 5 | 5 | 5 | 5 | 5 |
| Non-contaminating properties with adherends | (2 weeks) | AA | AA | AA | AA | AA |
|  | (2 months) | AA | AA | AA | AA | AA |
| Adhesion | (N/25 mm) | 0.18 | 0.03 | 0.03 | 0.10 | 0.29 |
| Pellet handling properties | (—) | AA | AA | AA | BB | CC |
| MFR of composition | (g/10 min) | 4 | 4 | 5 | 7 | 6 |

TABLE 2

|  |  |  | Example 5 | Example 6 | Example 7 | Example 8 |
|---|---|---|---|---|---|---|
| A-1 |  |  | 100 | 0 | 0 | 0 |
| A-2 |  |  | 0 | 100 | 0 | 0 |
| A-3 |  |  | 0 | 0 | 100 | 0 |
| A-4 |  |  | 0 | 0 | 0 | 100 |
| A-5 |  |  | 0 | 0 | 0 | 0 |
| B |  |  | 0 | 0 | 0 | 0 |
| Properties of propylene-based polymer (A) | MFR | (g/10 min) | 4 | 4 | 5 | 7 |
|  | Heat of crystal fusion | (J/g) | 17 | 37 | 36 | 16 |
|  | Crystallinity degree | (%) | 16 | 29 | 27 | 15 |
|  | Shore A hardness | (—) | 80 | 96 | 94 | 82 |
| Non-contaminating properties with adherends | (2 weeks) |  | AA | AA | AA | AA |
|  | (2 months) |  | AA | AA | AA | AA |
| Adhesion |  | (N/25 mm) | 0.04 | 0.01 | 0.01 | 0.05 |
| Pellet handling properties |  | (—) | AA | AA | AA | BB |

TABLE 3

|  |  | Example 9 | Example 10 | Example 11 | Comparative Example 2 |
|---|---|---|---|---|---|
| A-1 |  | 0 | 0 | 0 | 0 |
| A-2 |  | 60 | 0 | 0 | 0 |
| A-3 |  | 0 | 60 | 0 | 0 |
| A-4 |  | 0 | 0 | 60 | 0 |
| A-5 |  | 0 | 0 | 0 | 60 |
| B |  | 40 | 40 | 40 | 40 |
| Non-contaminating properties with adherends | (2 weeks) | AA | AA | AA | AA |
|  | (2 months) | AA | AA | AA | CC |
| Adhesion | (N/25 mm) | 0.0010 | 0.0010 | 0.0030 | 0.0090 |
| Pellet handling properties | (—) | AA | AA | AA | AA |
| MFR of composition | (g/10 min) | 5 | 6 | 7 | 6 |

The invention claimed is:

1. A pellet (X2) comprising the propylene-based polymer composition (C) comprising 50 to less than 100 parts by weight of a propylene-based polymer (A) and from more than 0 to 50 parts by weight of a polypropylene (B) (wherein the total of (A) and (B) is 100 parts by weight),
wherein the propylene-based polymer (A) comprises:
65 to 80 mol % of a structural unit derived from propylene, 5 to 10 mol % of a structural unit derived from ethylene and 15 to 25 mol % of a structural unit derived from a $C_{4-20}$ α-olefin (wherein these percentages are calculated based on 100 mol % of the total of the structural unit derived from propylene, the structural unit derived from ethylene and the structural unit derived from a $C_{4-20}$ α-olefin), has a heat of crystal fusion of 5 to 45 J/g as measured by DSC and has a triad tacticity [mm fraction (%)] of not less than 85% as determined by $^{13}$C-NMR; and
wherein the polypropylene (B) comprises not less than 90 mol % of a structural unit derived from propylene (wherein this percentage is calculated based on 100 mol % of all the structural units that form the polypropylene).

2. A pressure-sensitive adhesive comprising a propylene-based polymer composition (C) wherein the propylene-based polymer composition comprises 50 to less than 100 parts by weight of a propylene-based polymer (A) and from more than 0 to not more than 50 parts by weight of a polypropylene (B) (wherein the total of (A) and (B) is 100 parts by weight),
wherein the propylene-based polymer (A) comprises:
65 to 80 mol % of a structural unit derived from propylene, 5 to 10 mol % of a structural unit derived from ethylene and 15 to 25 mol % of a structural unit derived from a C4-20 α-olefin (wherein these percentages are calculated based on 100 mol % of the total of the structural unit derived from propylene, the structural unit derived from ethylene and the structural unit derived from a C4-20 α-olefin), has a heat of crystal fusion of 5 to 45 J/g as measured by DSC and has a triad tacticity [mm fraction (%)] of not less than 85% as determined by $^{13}$C-NMR; and
wherein the polypropylene (B) comprises not less than 90 mol % of a structural unit derived from propylene (wherein this percentage is calculated based on 100 mol % of all the structural units that form the polypropylene).

3. The pressure-sensitive adhesive according to any one of claim 2, wherein the propylene-based polymer (A) has a degree of crystallinity of 5 to 30% as measured by wide-angle X-ray diffractometry.

4. A pressure-sensitive adhesive sheet or film having at least one or more layers wherein the pressure-sensitive adhesive sheet or film has a pressure-sensitive adhesive layer comprising the pressure-sensitive adhesive of claim 2.

* * * * *

UNITED STATES PATENT AND TRADEMARK OFFICE
CERTIFICATE OF CORRECTION

| | | |
|---|---|---|
| PATENT NO. | : 8,288,479 B2 | Page 1 of 1 |
| APPLICATION NO. | : 12/449475 | |
| DATED | : October 16, 2012 | |
| INVENTOR(S) | : Akai et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 157 days.

Signed and Sealed this
Twenty-ninth Day of January, 2013

David J. Kappos
*Director of the United States Patent and Trademark Office*